United States Patent
Inose et al.

(10) Patent No.: US 11,774,014 B2
(45) Date of Patent: Oct. 3, 2023

(54) THREADED CONNECTION FOR STEEL PIPES

(71) Applicants: NIPPON STEEL CORPORATION, Tokyo (JP); VALLOUREC OIL AND GAS FRANCE, Aulnoye-Aymeries (FR)

(72) Inventors: Keita Inose, Tokyo (JP); Hikari Nakano, Tokyo (JP); Masaaki Sugino, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 17/056,811

(22) PCT Filed: Aug. 1, 2019

(86) PCT No.: PCT/JP2019/030172
§ 371 (c)(1),
(2) Date: Nov. 19, 2020

(87) PCT Pub. No.: WO2020/039875
PCT Pub. Date: Feb. 27, 2020

(65) Prior Publication Data
US 2021/0164593 A1    Jun. 3, 2021

(30) Foreign Application Priority Data
Aug. 24, 2018  (JP) .................................. 2018-157837

(51) Int. Cl.
*F16L 15/00* (2006.01)
*E21B 17/042* (2006.01)

(52) U.S. Cl.
CPC .......... *F16L 15/001* (2013.01); *E21B 17/042* (2013.01)

(58) Field of Classification Search
CPC ....... F16L 15/001; F16L 15/004; F16L 15/04; E21B 17/042
See application file for complete search history.

(56) References Cited

U.S. PATENT DOCUMENTS 2,122,757 A * 7/1938 Scott ..................... E21B 17/042
285/334
2,580,818 A * 1/1952 Mundy ................... F16L 41/14
285/919

(Continued)

FOREIGN PATENT DOCUMENTS

| CA | 2934937 A1 | 7/2015 |
| JP | 10096489 A | 4/1998 |

(Continued)

*Primary Examiner* — David Bochna
(74) *Attorney, Agent, or Firm* — Greer, Burns & Crain, Ltd.

(57) ABSTRACT

A disclosed threaded connection for steel pipes includes a pin and a box. The pin includes, in order from a front end of the pin toward a pipe body of the pin, an annular shoulder surface, an annular sealing surface located adjacent to the shoulder surface, and a male thread part. The box includes, in order from a pipe body of the box toward a front end of the box, an annular shoulder surface, an annular sealing surface located adjacent to the shoulder surface, and a female thread part. The pin shoulder surface and the box shoulder surface incline from a plane perpendicular to a pipe axis in a direction of screwing the pin. A diameter of an inner circumferential edge of the pin shoulder surface is smaller than a diameter of an inner circumferential edge of the box shoulder surface.

2 Claims, 2 Drawing Sheets

(56) References Cited

U.S. PATENT DOCUMENTS

| | | | |
|---|---|---|---|
| 4,244,607 A | 1/1981 | Blose | |
| 4,373,754 A * | 2/1983 | Bollfrass | F16L 15/004 285/334 |
| 4,488,738 A * | 12/1984 | Valdes | F16L 15/001 285/251 |
| 4,988,127 A * | 1/1991 | Cartensen | F16L 15/008 285/94 |
| 6,059,321 A * | 5/2000 | Lyall, III | F16L 21/022 285/139.2 |
| 2004/0017079 A1 | 1/2004 | Carcagno et al. | |
| 2009/0008087 A1* | 1/2009 | Getman | E21B 17/042 166/242.6 |
| 2013/0069364 A1* | 3/2013 | Martin | F16L 15/004 285/333 |
| 2014/0352837 A1* | 12/2014 | Yamamoto | F16L 15/004 138/96 T |
| 2016/0230909 A1* | 8/2016 | Zhao | F16L 15/001 |
| 2019/0360619 A1* | 11/2019 | Maruta | F16L 15/004 |

FOREIGN PATENT DOCUMENTS

| | | |
|---|---|---|
| JP | 2005526936 A | 9/2005 |
| JP | 2013511672 A | 4/2013 |
| JP | 2017072187 A | 4/2017 |
| WO | 2007017082 A1 | 2/2007 |
| WO | 2017097700 A2 | 6/2017 |

* cited by examiner

THREADED CONNECTION FOR STEEL PIPES

This is a National Phase Application filed under 35 U.S.C. § 371, of International Application No. PCT/JP2019/030172, filed Aug. 1, 2019, the contents of which are incorporated by reference.

TECHNICAL FIELD

The present invention relates to a threaded connection used for connecting steel pipes.

BACKGROUND ART

In an oil well, natural gas well, and the like (hereafter, collectively referred to as an "oil well"), steel pipes called oil country tubular goods (OCTG) are used to mining underground resources. The steel pipes are connected one by one. To connect the steel pipes, threaded connections are used.

Types of the threaded connection for steel pipes are roughly categorized into a coupling type and an integral type. In a case of a threaded connection of the coupling type, one of tubes in a pair to be connected is a steel pipe, and the other one is a coupling. In this case, male thread parts are formed on outer circumferences of both end portions of the steel pipe, and female thread parts are formed on inner circumferences of both end portions of the coupling. The steel pipe and the coupling are then connected with each other. In a case of a threaded connection of the integral type, tubes in a pair to be connected are both steel pipes, and a coupling is not used separately. In this case, a male thread part is formed on an outer circumference of one end portion of each steel pipe, and a female thread part is formed on an inner circumference of the other end portion. One and the other of the steel pipes are then connected with each other.

A joint portion of a tube leading end portion on which a male thread part is formed includes an element to be inserted into a female thread part, and thus is called a pin. In contrast, a joint portion of a tube leading end portion on which a female thread part is formed includes an element to receive a male thread part, and thus is called a box. The pin and the box are end portions of a tube and are thus both tubular.

FIG. 1 is a longitudinal sectional view illustrating a typical threaded connection for steel pipes as conventionally used. The threaded connection illustrated in FIG. 1 is a threaded connection of the coupling type and includes a pin 10 and a box 20 (e.g., see Japanese Patent Application Publication No. 10-096489 (Patent Literature 1)).

The pin 10 includes, in order from a front end of the pin 10 toward a pipe body 11 of the pin 10, an annular shoulder surface 12, an annular sealing surface 13, and a male thread part 14. In the pin 10, the sealing surface 13 is located adjacent to the shoulder surface 12. The box 20 includes, in order from a pipe body 21 of the box 20 toward a front end of the box 20, an annular shoulder surface 22, an annular sealing surface 23, and a female thread part 24. In the box 20, the sealing surface 23 is located adjacent to the shoulder surface 22.

When the pin 10 and the box 20 are connected to each other, by screwing the pin 10 into the box 20, the shoulder surface 12 of the pin 10 comes into contact with the shoulder surface 22 of the box 20. When rotation of the pin 10 is continued by a predetermined amount, a fastening axial tension is generated between the male thread part 14 and the female thread part 24 meshing with each other, and fastening is thereby completed. In a state where the fastening is completed (hereafter, referred to also as a "fastening state"), the sealing surface 13 of the pin 10 comes in contact with the sealing surface 23 of the box 20 while interfering with the sealing surface 23, forming a seal part by metal contact. This seal part ensures a sealing ability of the threaded connection.

In recent years, as oil wells are increasingly shifted at great depths and to hadal zones, oil well environments become harsh with high temperatures and high pressures. In such oil well environments, a compressive load, a tensile load, and pressures from the outside (hereafter, also referred to as "external pressures") and pressures from the inside (hereafter, also referred to as "internal pressures") applied to oil country tubular goods are extremely high. For that reason, heavy-wall steel pipes are used particularly as oil country tubular goods for casing or tubing. In a case where a threaded connection illustrated in FIG. 1 is used for connecting such heavy-wall steel pipes, the threaded connection is required to have a comparable level of strength to that of bodies of the heavy-wall steel pipes and high sealing ability. In particular, the sealing ability against an external pressure is required.

Here, the compressive load is received by a contact surface between a shoulder surface 12 of a pin 10 and a shoulder surface 22 of a box 20 (hereafter, also referred to as a "shoulder contact surface"). Referring to FIG. 1, in a conventional threaded connection, to ensure an area of the shoulder contact surface to the maximum, the shoulder surface 12 of the pin 10 is brought into contact with the shoulder surface 22 of the box 20 over their entire areas. Specifically, a diameter Dpi of an inner circumferential edge of the shoulder surface 12 of the pin 10 is substantially the same as a diameter Dbi of the inner circumferential edge of the shoulder surface 22 of the box 20.

CITATION LIST

Patent Literature

PATENT LITERATURE 1: Japanese Patent Application Publication No. 10-096489

SUMMARY OF INVENTION

Technical Problem

An objective of the present invention is to provide a threaded connection for steel pipes that is capable of ensuring sufficient sealing ability against external pressures even in a case of using a heavy-wall steel pipe.

Solution to Problem

A threaded connection for steel pipes according to an embodiment of the present invention includes a tubular pin and a tubular box. The pin includes, in order from a front end of the pin toward a pipe body of the pin, an annular shoulder surface, an annular sealing surface located adjacent to the shoulder surface of the pin, and a male thread part. The box includes, in order from a pipe body of the box toward a front end of the box, an annular shoulder surface, an annular sealing surface located adjacent to the shoulder surface of the box, and a female thread part. The shoulder surface of each of the pin and the box inclines from a plane perpendicular to a pipe axis in a direction of screwing the pin. A diameter of an inner circumferential edge of the shoulder surface of the pin is smaller than a diameter of an inner circumferential edge of the shoulder surface of the box.

Advantageous Effect of Invention

With the threaded connection for steel pipes according to an embodiment of the present invention, a sealing ability against external pressure can be sufficiently ensured even in a case of using a heavy-wall steel pipe.

DESCRIPTION OF EMBODIMENTS

To solve the above problem, the present inventors conducted various analyses and tests, and conducted intensive studies. Consequently, the following findings were obtained.

Figure 1:
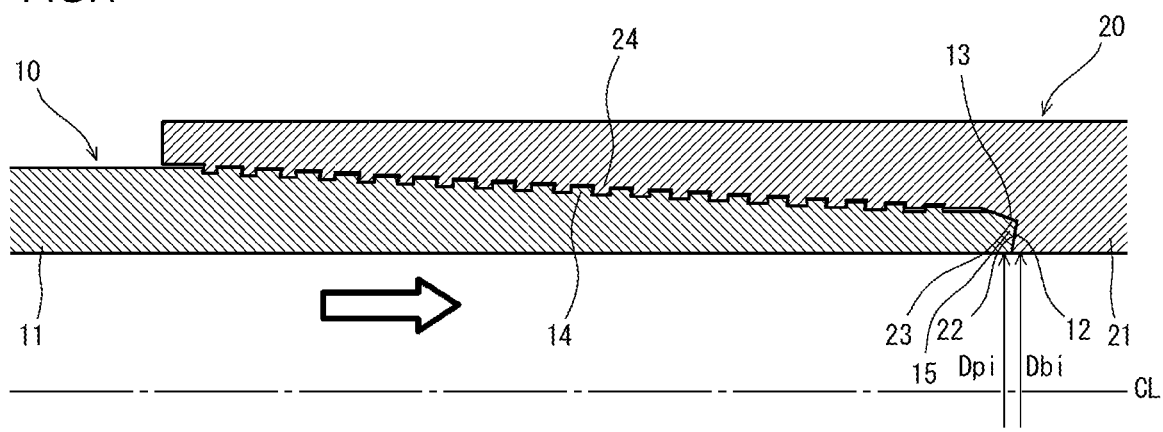
FIG. 1 is a longitudinal sectional view illustrating a typical threaded connection for steel pipes as conventionally used.

To increase sealing ability of a threaded connection used for a heavy-wall steel pipe, the following techniques are conceivable. As a first technique, referring to FIG. 1, it is conceivable to increase a wall thickness of a portion 15 including a sealing surface 13 of a pin 10 (hereafter, also referred to as a "pin seal part").

The first technique is derived from the following inference. When the wall thickness of the pin seal part 15 is large, a rigidity of the pin seal part 15 is increased in a radial direction. This large wall thickness improves an elastic resilience of the pin seal part 15, which leads to an increase in a contact force between the sealing surface 13 of the pin 10 and a sealing surface 23 of a box 20 in a fastening state (hereafter, also referred to as a "seal contact force"), and thus an increase in the sealing ability against internal pressures and external pressures. In addition, the large wall thickness prevents radially-contractive deformation of the pin seal part 15 when an external pressure is applied to the pin 10. For that reason, it is possible to minimize the decrease in the seal contact force even when an external pressure is applied to the pin 10. Therefore, it may be said that a large wall thickness of the pin seal part 15 can prevent the sealing ability against external pressures from decreasing.

In the first technique, since the wall thickness of the pin seal part 15 is increased, a shoulder surface 12 of the pin 10 has a large area. In a conventional threaded connection, the shoulder surface 12 of the pin 10 comes into contact with the shoulder surface 22 of the box 20 over their entire areas. Therefore, the shoulder surface 22 of the box 20 also has a large area. In other words, a shoulder contact surface has a large area.

However, if the shoulder contact surface has an excessively large area, a contact force between the shoulder surface 12 of the pin 10 and the shoulder surface 22 of the box 20 (hereafter, also referred to as a shoulder contact force) becomes uneven in the shoulder contact surface. The unevenness of the shoulder contact force has a significant influence on a seal part, which is adjacent to the shoulder contact surface. For that reason, contact of the seal part actually becomes unstable, resulting in a decrease in the sealing ability.

In contrast to the first technique described above, as a second technique, it is conceivable to decrease the wall thickness of the pin seal part 15. In such a case, the decrease in the wall thickness of the pin seal part 15 makes the area of the shoulder surface 12 of the pin 10 small, and also makes the area of the shoulder surface 22 of the box 20 small. For that reason, the shoulder contact surface has a small area. Therefore, the shoulder contact force can be made uniform.

However, in the second technique, since the wall thickness of the pin seal part 15 is decreased, the rigidity of the pin seal pan 15 is low in the radial direction. This makes the pin seal part 15 susceptible to radially-contractive deformation when an external pressure is applied to the pin 10. For that reason, the sealing ability against external pressures is actually decreased.

Briefly, it is not possible to ensure the sealing ability against external pressures by both of the first and second techniques.

Thus, in consideration of the problems with the first and second techniques, the present inventors paid attention to the pin seal part and the shoulder contact surface. Specifically, the wall thickness of the pin seal part is increased, and at the same time, the area of the shoulder contact surface is decreased. This increases the rigidity of the pin seal part in the radial direction and also makes the shoulder contact force uniform in the shoulder contact surface. Therefore, stabilization of the contact of the seal part can be achieved. Consequently, it is possible to ensure the sealing ability against external pressures.

The threaded connection for steel pipes according to the present invention is completed based on the above findings.

A threaded connection for steel pipes according to an embodiment of the present invention includes a tubular pin and a tubular box. The pin includes, in order from a front end of the pin toward a pipe body of the pin, an annular shoulder surface, an annular sealing surface located adjacent to the shoulder surface of the pin, and a male thread part. The box includes, in order from a pipe body of the box toward a front end of the box, an annular shoulder surface, an annular sealing surface located adjacent to the shoulder surface of the box, and a female thread part. The shoulder surface of each of the pin and the box inclines from a plane perpendicular to a pipe axis in a direction of screwing the pin. A diameter of an inner circumferential edge of the shoulder surface of the pin is smaller than a diameter of an inner circumferential edge of the shoulder surface of the box.

In a typical example, the threaded connection in the present embodiment is used for connecting heavy-wall steel pipes used as casing pipes or tubing pipes. Wall thicknesses of the heavy-wall steel pipes are more than 1 inch (25.4 mm).

In the threaded connection in the present embodiment, an area of the shoulder surface of the pin is large, and an area of the shoulder surface of the box is small. This is because the diameter of the inner circumferential edge of the shoulder surface of the pin is smaller than the diameter of the inner circumferential edge of the shoulder surface of the box. This makes a wall thickness of the pin seal part large, which increases a rigidity of the pin seal part in the radial direction. In addition, the area of the shoulder contact surface being small makes the shoulder contact force uniform across the shoulder contact surface.

In addition, in the threaded connection in the present embodiment, when the threaded connection is in a fastening state, the shoulder surface of the pin and the shoulder surface of the box are in pressing contact with each other in a hooked form. This is because the shoulder surface of each of the pin and the box inclines from a plane perpendicular to a pipe axis in a direction of screwing the pin. This causes the pin seal part to receive a reaction force all the time in a direction in which the pin seal part radially expands. The pin seal part thus resists radially-contractive deformation when an external pressure is applied to the pin.

From the above reason, the contact between the seal parts is stabilized even in a case of using a heavy-wall steel pipe. Consequently, it is possible to ensure the sealing ability against external pressures sufficiently.

In the above threaded connection, a feed angle of the shoulder surface of each of the pin and the box with respect to the plane perpendicular to the pipe axis is preferably 5° to 20°. When the feed angle of the shoulder surfaces are 5° or more, the shoulder surface of the pin and the shoulder surface of the box are in an effective pressing contact with each other in the hooked form in the fastening state. The feed angle of the shoulder surface is preferably 10° or more. At the same time, when the feed angle of shoulder surface is 20° or less, deformation of a shoulder part of the box is small even when a compressive load is repeatedly applied. Therefore, the pressing contact between the shoulder surfaces in the hooked form is effectively maintained.

In the above threaded connection, a thickness tp of an annular pin shoulder region that appears when the shoulder surface of the pin is projected onto the plane perpendicular to the pipe axis is preferably 60% or more of a wall thickness t of the pipe body of the pin. When the thickness tp of the pin shoulder region is 60% or more of the wall thickness t of the pipe body of the pin, the wall thickness of the pin seal part is effectively large.

In contrast, an upper limit of the thickness tp of the pin shoulder region is not limited to a particular thickness. However, an excessively large thickness tp of the pin shoulder region makes it difficult to secure a length of the male thread part. Thus, the thickness tp of the pin shoulder region is preferably 80% or less of the wall thickness t of the pipe body of the pin.

In the above threaded connection, a thickness tb of an annular box shoulder region that appears when the shoulder surface of the box is projected onto the plane perpendicular to the pipe axis is preferably 20% or more to 55% or less of the wall thickness t of the pipe body of the pin. The box shoulder region is equivalent to an annular shoulder contact surface region that appears when the shoulder contact surface is projected onto the plane perpendicular to the pipe axis.

When the thickness tb of the box shoulder region (shoulder contact surface region) is 20% or more of the wall thickness t of the pipe body of the pin, in a case where an excessively heavy compressive load is applied to the threaded connection, plastic deformation of the shoulder surface and the sealing surface adjacent to the shoulder surface can be prevented, which can stabilizes a contact state of the sealing surface. Consequently, it is possible to ensure the seal contact force. More preferably, the thickness tb of the box shoulder region is 30% or more of the wall thickness t of the pipe body of the pin. In contrast, when the thickness tb of the box shoulder region is 55% or less of the wall thickness t of the pipe body of the pin, an area of the shoulder contact surface is made significantly small. More preferably, the thickness tb of the box shoulder region is 45% or less of the wall thickness t of the pipe body of the pin.

To be exact, there is a convex corner part between the shoulder surface and the sealing surface seen in a longitudinal section of the pin. This convex corner part connects the shoulder surface and the sealing surface of the pin seamlessly. Similarly, there is a concave corner part between the shoulder surface and the sealing surface seen in a longitudinal section of the box. This concave corner part connects the shoulder surface and the sealing surface of the box seamlessly. Radii of these convex corner part and concave corner part seen in the longitudinal section are at most about 1.5 mm. In this case, the thickness tp of the pin shoulder region does not include a region of the convex corner part. Similarly, the thickness tb of the box shoulder region does not include a region of the concave corner part.

Hereafter, a specific example of a threaded connection for steel pipes according to the present embodiment will be described with reference to the accompanying drawings.

Figure 2:
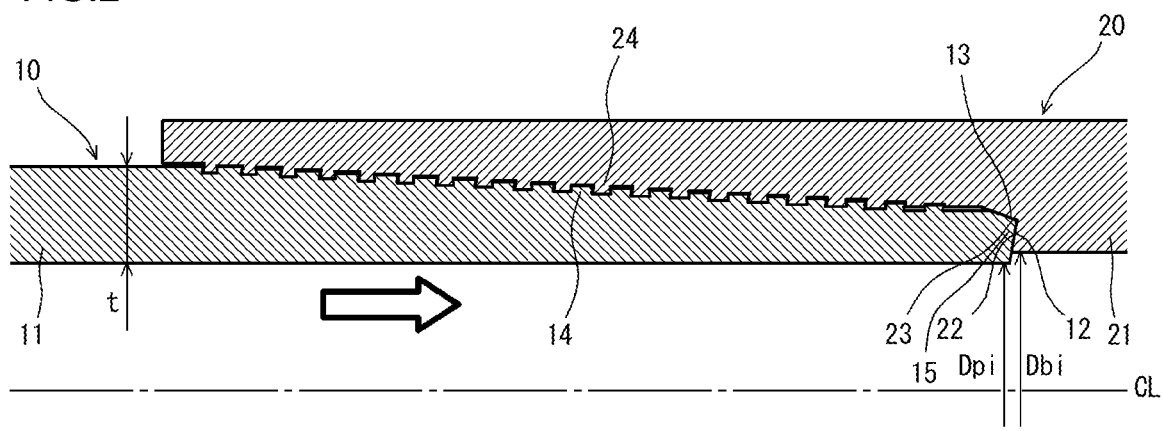
FIG. 2 is a longitudinal sectional view illustrating a threaded connection for steel pipes in the present embodiment.
Figure 3:
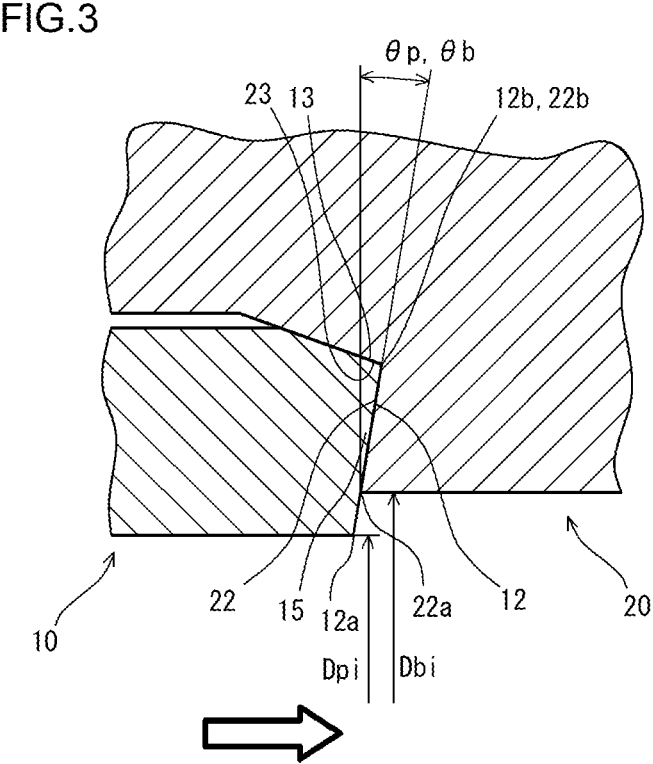
FIG. 3 is a longitudinal sectional view illustrating a vicinity of a front end of a pin of the threaded connection illustrated in FIG. 2, in an enlarged manner.
Figure 4:
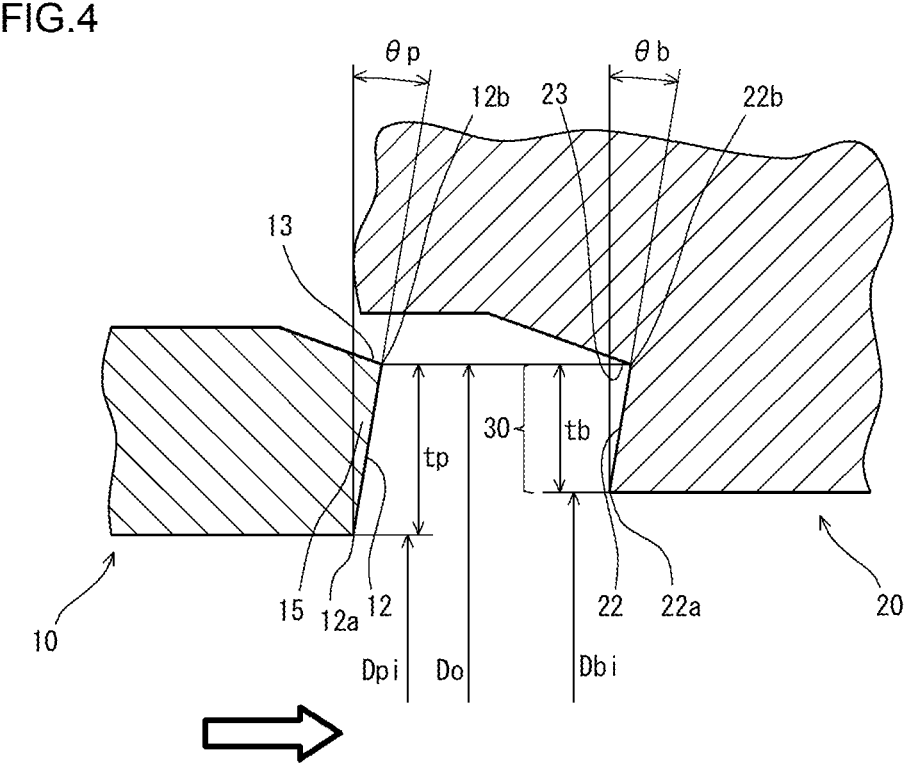
FIG. 4 is a longitudinal sectional view illustrating a vicinity of a front end of a pin of the threaded connection illustrated in FIG. 2, in an enlarged manner.

FIG. 2 is a longitudinal sectional view illustrating the threaded connection for steel pipes in the present embodiment. FIG. 3 and FIG. 4 are longitudinal sectional views each illustrating a vicinity of a front end of the pin of the threaded connection illustrated in FIG. 2, in an enlarged manner. FIG. 3 illustrates the fastening state. FIG. 4 illustrates a state where the pin 10 is separated from the box 20, for convenience of description. Solid-white arrows in FIG. 2 to FIG. 4 illustrate a direction of screwing the pin 10 with respect to the box 20. In the present specification, a longitudinal section refers to a cross section including a pipe axis CL of the threaded connection (see FIG. 2).

Referring to FIG. 2 to FIG. 4, the threaded connection in the present embodiment is a threaded connection of the coupling type and includes the pin 10 and the box 20. The pin 10 is a heavy-wall steel pipe.

The pin 10 includes, in order from a front end of the pin 10 toward a pipe body 11 of the pin 10, an annular shoulder surface 12, an annular sealing surface 13, and a male thread part 14. Hereinafter, the shoulder surface 12 of the pin 10 will be referred to also as a "pin shoulder surface". The sealing surface 13 of the pin 10 will be referred to also as a "pin sealing surface".

The pin shoulder surface 12 is an annular surface forming a front end surface of the pin 10 and inclines from the plane perpendicular to the pipe axis CL in the direction of screwing the pin 10. This causes an outer circumferential edge 12b of the pin shoulder surface 12 (an edge farthest from the pipe axis CL) to protrude from an inner circumferential edge 12a of the pin shoulder surface 12 (an edge closest to the pipe axis CL) in the direction of screwing the pin 10. The pin sealing surface 13 is located adjacent to the pin shoulder surface 12. That is, the pin sealing surface 13 is connected to the outer circumferential edge 12b of the pin shoulder surface 12. The pin sealing surface 13 is a tapered annular surface. Note that the pin sealing surface 13 may have a shape formed by combining the tapered annular surface and a surface equivalent to a circumferential surface of a solid of revolution obtained by rotating a curve such as an arc about the pipe axis CL. A diameter of the pin sealing surface 13 decreases as the pin 10 extends toward its front end side (close to the pin shoulder surface 12).

The box 20 includes, in order from a pipe body 21 of the box 20 toward a front end of the box 20, an annular shoulder surface 22, an annular sealing surface 23, and a female thread part 24. Hereinafter, the shoulder surface 22 of the box 20 will be referred to also as a "box shoulder surface". The sealing surface 23 of the box 20 will be referred to also as a "box sealing surface".

The box shoulder surface 22 is an annular surface corresponding to the pin shoulder surface 12 and inclines from the plane perpendicular to the pipe axis CL in the direction of screwing the pin 10. This causes an inner circumferential edge 22a of the box shoulder surface 22 (an edge closest to the pipe axis CL) to protrude from an outer circumferential edge 22b of the box shoulder surface 22 (an edge farthest from the pipe axis CL) in an opposite direction to the direction of screwing the pin 10. The box sealing surface 23 is located adjacent to the box shoulder surface 22. That is, the box sealing surface 23 is connected to the outer circumferential edge 22b of the box shoulder surface 22. This box sealing surface 23 is a tapered annular surface corresponding to the pin sealing surface 13. Note that the box sealing surface 23 may have a shape formed by combining the tapered annular surface and a surface equivalent to a circumferential surface of a solid of revolution obtained by rotating a curve such as an arc about the pipe axis CL.

The male thread part 14 of the pin 10 corresponds to the female thread part 24 of the box 20. Each of the male thread part 14 and the female thread part 24 includes crests, roots, stabbing flanks, and load flanks.

In the present embodiment, a diameter Dpi of the inner circumferential edge 12a of the pin shoulder surface 12 is smaller than a diameter Dbi of the inner circumferential edge 22a of the box shoulder surface 22. An area of the pin shoulder surface 12 is large, and an area of the box shoulder surface 22 is small. For that reason, a shoulder contact surface 30 has a small area. The diameter Dpi of the inner circumferential edge 12a of the pin shoulder surface 12 is the same as an inner diameter of the pipe body 11 of the pin 10. That is, the inner diameter of the pin 10 is constant.

In the present embodiment, feed angles θp and θb of the pin shoulder surface 12 and the box shoulder surface 22 with respect to the surface perpendicular to the pipe axis CL are 5° to 20°. The thickness tp of the annular pin shoulder region that appears when the pin shoulder surface 12 is projected onto the plane perpendicular to the pipe axis CL is 60% or more of the wall thickness t of the pipe body 11 of the pin 10. The thickness tb of the annular box shoulder region that appears when the box shoulder surface 22 is projected onto the plane perpendicular to the pipe axis CL is 20% or more to 55% or less of the wall thickness t of the pipe body 11 of the pin 10.

When the pin 10 and the box 20 are connected to each other, by screwing the pin 10 into the box 20, the male thread part 14 meshes with the female thread part 24. A part of the pin shoulder surface 12 comes in contact with a whole area of the box shoulder surface 22. That is, the pin shoulder surface 12 comes in contact with the box shoulder surface 22 within a range of the shoulder contact surface 30. When rotation of the pin 10 is continued by a predetermined amount, the part of the pin shoulder surface 12 and the whole area of the box shoulder surface 22 are in pressing contact with each other in the hooked form. This generates a fastening axial tension between the male thread part 14 and the female thread part 24 meshing with each other, and fastening is thereby completed. In the fastening state, the pin sealing surface 13 comes in contact with the box sealing surface 23 while interfering with the box sealing surface 23, forming a seal part by metal contact. This seal part ensures the sealing ability of the threaded connection.

Referring to FIG. 2 to FIG. 4, in the threaded connection in the present embodiment, the area of the pin shoulder surface 12 is large, and the area of the box shoulder surface 22 is small. This makes a wall thickness of the pin seal part 15 large, which increases a rigidity of the pin seal part 15 in the radial direction. In addition, the area of the shoulder contact surface 30 being small makes the shoulder contact force uniform across the shoulder contact surface 30.

In addition, in the threaded connection in the present embodiment, when the threaded connection is in the fastening state, the part of the pin shoulder surface 12 and the whole area of the box shoulder surface 22 are in the pressing contact with each other in the hooked form. This causes the pin seal part 15 to receive a reaction force all the time in a direction in which the pin seal part radially expands. The pin seal part 15 thus resists radially-contractive deformation when an external pressure is applied to the pin 10.

From the above reason, the contact between the seal parts is stabilized even in a case of using a heavy-wall steel pipe. Consequently, it is possible to ensure the sealing ability against external pressures sufficiently.

EXAMPLES

To confirm effects brought by the present embodiment, the present inventors conducted numerical simulations and analyses using the elasto-plastic finite element method (FEM analysis).

Example 1

[Test Conditions]

In the FEM analysis, a model was used of a coupling-type threaded connection in which a diameter Dpi of an inner circumferential edge of a pin shoulder surface and a diameter Dbi of an inner circumferential edge of a box shoulder surface were variously changed. The followings are common conditions.

Dimensions of steel pipe (pin body): 7⅝ inches×1.06 inches (outer diameter was 193.7 mm, wall thickness was 27.0 mm)

Grade of steel pipe: P110 according to the API standard (a carbon steel having a nominal yield stress of 110 ksi)

Diameter Do of outer circumferential edge of shoulder surface (pin shoulder surface and box shoulder surface): 179.9 mm Feed angle of shoulder surface: 15°

Thread pitch: 5.08 mm

Flank angle of load flank: −3°

Flank angle of stabbing flank: 10°

Clearance in stabbing flank: 0.15 mm

Changed dimensional conditions were according to Table 1 shown below.

TABLE 1

| No. | Dpi [mm] | Dbi [mm] | Dpi − Dbi [mm] | tp/t [%] | tb/t [%] | Sealing ability [Dimensionless] External pressure + compressive load | Sealing ability [Dimensionless] Only external pressure | Category |
|---|---|---|---|---|---|---|---|---|
| 1 | 146.67 | 154.32 | −7.65 | 62 | 47 | 1.17 | 1.18 | Inventive Example |
| 2 | 146.67 | 146.67 | 0 | 62 | 63 | 1.00 | 1.00 | Comparative Example (Reference) |
| 3 | 146.67 | 150.20 | −3.53 | 62 | 55 | 1.10 | 1.08 | Inventive Example |
| 4 | 146.67 | 158.45 | −11.78 | 62 | 40 | 1.22 | 1.25 | Inventive Example |
| 5 | 146.67 | 162.58 | −15.91 | 62 | 32 | 1.20 | 1.21 | Inventive Example |
| 6 | 146.67 | 166.71 | −20.04 | 62 | 24 | 1.11 | 1.13 | Inventive Example |
| 7 | 150.20 | 150.20 | 0 | 55 | 56 | 0.95 | 0.70 | Comparative Example |
| 8 | 154.32 | 154.32 | 0 | 47 | 48 | 0.86 | 0.32 | Comparative Example |
| 9 | 158.45 | 158.45 | 0 | 40 | 41 | 0.70 | 0.00 | Comparative Example |

(Note)
Meanings of the signs in Table 1 are as follows.
Dpi: Diameter of inner circumferential edge of pin shoulder surface [mm]
Dbi: Diameter of inner circumferential edge of box shoulder surface [mm]
tp: Thickness of pin shoulder region [mm]
t: Wall thickness of pipe body of pin [mm]
tb: Thickness of box shoulder region [mm]

In the FEM analysis, a material of the threaded connection was assumed to be an isotropic-hardening elasto-plastic body. A modulus of elasticity of the elasto-plastic body was set at 210 GPa, and a yield strength of the elasto-plastic body as a 0.2% yield stress was set at 110 ksi (758.3 MPa). Tightening was performed until the pin shoulder surface came into contact with the box shoulder surface and a 1.0/100 turn was made.

Test Nos. 1 and 3 to 6 were Inventive Examples of the present invention intended to represent threaded connections in the present embodiment, in each of which the diameter Dpi of the inner circumferential edge of the pin shoulder surface was smaller than the diameter Dbi of the inner circumferential edge of the box shoulder surface. Test No. 2 was Comparative Example as a reference intended to represent a conventional threaded connection, in which the diameter Dpi of the inner circumferential edge of the pin shoulder surface was the same as the diameter Dbi of the inner circumferential edge of the box shoulder surface. Test Nos. 7 to 9 were Comparative Examples, in each of which the diameter Dpi of the inner circumferential edge of the pin shoulder surface was the same as the diameter Dbi of the inner circumferential edge of the box shoulder surface.

[Evaluation Method]

In the FEM analysis, load steps (combinations of internal pressure, external pressure, tensile load, and compressive load) that simulate Series A test according to ISO13679 2011 were applied to the model in a fastening state. Of load points in an external pressure cycle in a loading step history, attention was paid to a load point of an external pressure and a compressive load and a load point of only an external pressure, and at each of the load points, sealing ability of a seal part was evaluated. Here, a seal contact force [N/mm] under the external pressure and compressive load, and a seal contact force [N/mm] under only the external pressure were investigated. The seal contact force mentioned here refers to a value of [average contact interfacial pressure between sealing surfaces]×[contact width], and means that the higher the value, the better the sealing ability.

A specific evaluation of the sealing ability was conducted with reference to Test No. 2. Specifically, the seal contact force under the external pressure and compressive load, and the seal contact force under only the external pressure in Test No. 2 were regarded as references (1.00), and a ratio of seal contact forces in each Test No were compared with the respective seal contact forces in Test No. 2.

[Test Result]

The test results are shown in the above Table 1. From the results shown in Table 1, the followings are indicated. In each of Test Nos. 1 and 3 to 6 being Inventive Example of the present invention, the sealing ability was improved as compared with Test No. 2 being Comparative Example as the reference. This was attributable to such a condition that the diameter Dpi of the inner circumferential edge of the pin shoulder surface was smaller than the diameter Dbi of the inner circumferential edge of the box shoulder surface. In particular, in each of Test Nos. 1 and 3 to 6, the sealing ability was further improved. This was attributable to such a condition that a thickness of tp of a pin shoulder region was 60% or more of a wall thickness t of a pipe body of the pin, so that the wall thickness of the pin seal part was effectively large. In addition, this further improvement in the sealing ability was attributable to such a condition that a thickness tb of a box shoulder region was 55% or less of the wall thickness t of the pipe body of the pin, so that the area of the shoulder contact surface was effectively small.

In contrast, in each of Test Nos. 7 to 9 being Comparative Examples, the sealing ability was decreased as compared with Test No. 2 as the reference. This was attributable to such a condition that the diameter Dpi of the inner circumferential edge of the pin shoulder surface was the same as the diameter Dbi of the inner circumferential edge of the box shoulder surface. In particular, this decrease in the sealing ability was also attributable to such a condition that the thickness tp of the pin shoulder region did not reach 60% of wall thickness t of the pipe body of the pin, so that the wall thickness of the pin seal part was small.

Example 2

[Test Conditions]

In Example 2, the same FEM analysis as that in the above Example 1 was conducted. In particular, in Example 2, the feed angle of the shoulder surface was set at 5°. The otherwise common conditions were the same as those in the above Example 1. Changed dimensional conditions (diameter Dpi of the inner circumferential edge of the pin shoulder surface, and diameter Dbi of the inner circumferential edge of the box shoulder surface) were according to Table 2 shown below.

inner circumferential edge of the box shoulder surface. Test Nos. 16 to 18 were Comparative Examples, in each of which the diameter Dpi of the inner circumferential edge of the pin shoulder surface was the same as the diameter Dbi of the inner circumferential edge of the box shoulder surface.

[Evaluation Method]

As in the above Example 1, the sealing ability was evaluated. Specifically, the evaluation of the sealing ability was conducted with reference to Test No. 11. Specifically, the seal contact force under the external pressure and compressive load, and the seal contact force under only the external pressure in Test No. 11 were regarded as references (1.00), and ratios of seal contact forces in each Test No were compared to the respective seal contact forces in Test No. 11.

[Test Result]

The test results are shown in the above Table 2. From the results shown in Table 2, the followings are indicated. In each of Test Nos. 10 and 12 to 15 being Inventive Example of the present invention, the sealing ability was improved as compared with Test No. 11 being Comparative Example as the reference. This was attributable to such a condition that the diameter Dpi of the inner circumferential edge of the pin shoulder surface was smaller than the diameter Dbi of the inner circumferential edge of the box shoulder surface.

TABLE 2

| No. | Dpi [mm] | Dbi [mm] | Dpi − Dbi [mm] | tp/t [%] | tb/t [%] | Sealing ability [dimensionless] | | Category |
| --- | --- | --- | --- | --- | --- | --- | --- | --- |
| | | | | | | External pressure + compressive load | Only external pressure | |
| 10 | 146.67 | 154.32 | −7.65 | 62 | 47 | 1.28 | 1.17 | Inventive Example |
| 11 | 146.67 | 146.67 | 0 | 62 | 63 | 1.00 | 1.00 | Comparative Example (Reference) |
| 12 | 146.67 | 150.20 | −3.53 | 62 | 55 | 1.14 | 1.10 | Inventive Example |
| 13 | 146.67 | 158.45 | −11.78 | 62 | 40 | 1.38 | 1.22 | Inventive Example |
| 14 | 146.67 | 162.58 | −15.91 | 62 | 32 | 1.46 | 1.25 | Inventive Example |
| 15 | 146.67 | 166.71 | −20.04 | 62 | 24 | 1.41 | 1.21 | Inventive Example |
| 16 | 150.20 | 150.20 | 0 | 55 | 56 | 0.91 | 0.69 | Comparative Example |
| 17 | 154.32 | 154.32 | 0 | 47 | 48 | 0.74 | 0.28 | Comparative Example |
| 18 | 158.45 | 158.45 | 0 | 40 | 41 | 0.52 | 0.00 | Comparative Example |

(Note)
Meanings of the signs in Table 2 are as follows.
Dpi: Diameter of inner circumferential edge of pin shoulder surface [mm]
Dbi: Diameter of inner circumferential edge of box shoulder surface [mm]
tp: Thickness of pin shoulder region [mm]
t: Wall thickness of pipe body of pin [mm]
tb: Thickness of box shoulder region [mm]

Test Nos. 10 and 12 to 15 were Inventive Examples of the present invention intended to represent a threaded connection in the present embodiment, in each of which the diameter Dpi of the inner circumferential edge of the pin shoulder surface was smaller than the diameter Dbi of the inner circumferential edge of the box shoulder surface. Test No. 11 was Comparative Example as a reference intended to represent a conventional threaded connection, in which the diameter Dpi of the inner circumferential edge of the pin shoulder surface was the same as the diameter Dbi of the In contrast, in each of Test Nos. 16 to 18 being Comparative Examples, the sealing ability was decreased as compared with Test No. 11 as the reference. This was attributable to such a condition that the diameter Dpi of the inner circumferential edge of the pin shoulder surface was the same as the diameter Dbi of the inner circumferential edge of the box shoulder surface.

The present invention is not limited to the embodiments described above, and various modifications may be made without departing from the spirit and scope of the present invention. For example, the threaded connection may be of any one of a coupling type and an integral type.

INDUSTRIAL APPLICABILITY

The threaded connection according to the present invention can be effectively used for connecting steel pipes used as oil country tubular goods.

REFERENCE SIGNS LIST 10 pin
11 pipe body
12 shoulder surface
12a inner circumferential edge
12b outer circumferential edge
13 sealing surface
14 male thread part
15 pin seal part
20 box
21 pipe body
22 shoulder surface
22a inner circumferential edge
22b outer circumferential edge
23 sealing surface
24 female thread part
30 shoulder contact surface
Do diameter of outer circumferential edge of shoulder surface
Dpi diameter of inner circumferential edge of pin shoulder surface
Dbi diameter of inner circumferential edge of box shoulder surface
tp thickness of pin shoulder region
tb thickness of box shoulder region
t wall thickness of pipe body of pin
CL pipe axis

The invention claimed is:

1. A steel pipe threaded connection comprising a tubular pin and a tubular box, wherein
the pin includes, in order from a front end of the pin toward a pipe body of the pin, an annular shoulder surface, an annular sealing surface located adjacent to the shoulder surface of the pin, and a male thread part,
the box includes, in order from the pipe body of the box toward the front end of the box, an annular shoulder surface, an annular sealing surface located adjacent to the shoulder surface of the box, and a female thread part,
the shoulder surface of each of the pin and the box inclines from a plane perpendicular to a pipe axis in a direction of screwing the pin,
a diameter of an inner circumferential edge of the shoulder surface of the pin is smaller than a diameter of an inner circumferential edge of the shoulder surface of the box,
a thickness of an annular pin shoulder region that appears when the shoulder surface of the pin is projected onto the plane perpendicular to the pipe axis is 60% or more of a wall thickness of the pipe body of the pin, and
a thickness of an annular box shoulder region that appears when the shoulder surface of the box is projected onto the plane perpendicular to the pipe axis is 20% or more and 45% or less of a wall thickness of the pipe body of the pin.

2. The steel pipe threaded connection according to claim 1, wherein a feed angle of the shoulder surface of each of the pin and the box with respect to the plane perpendicular to the pipe axis is 5° to 20°.

* * * * *